Figures 1, 2:
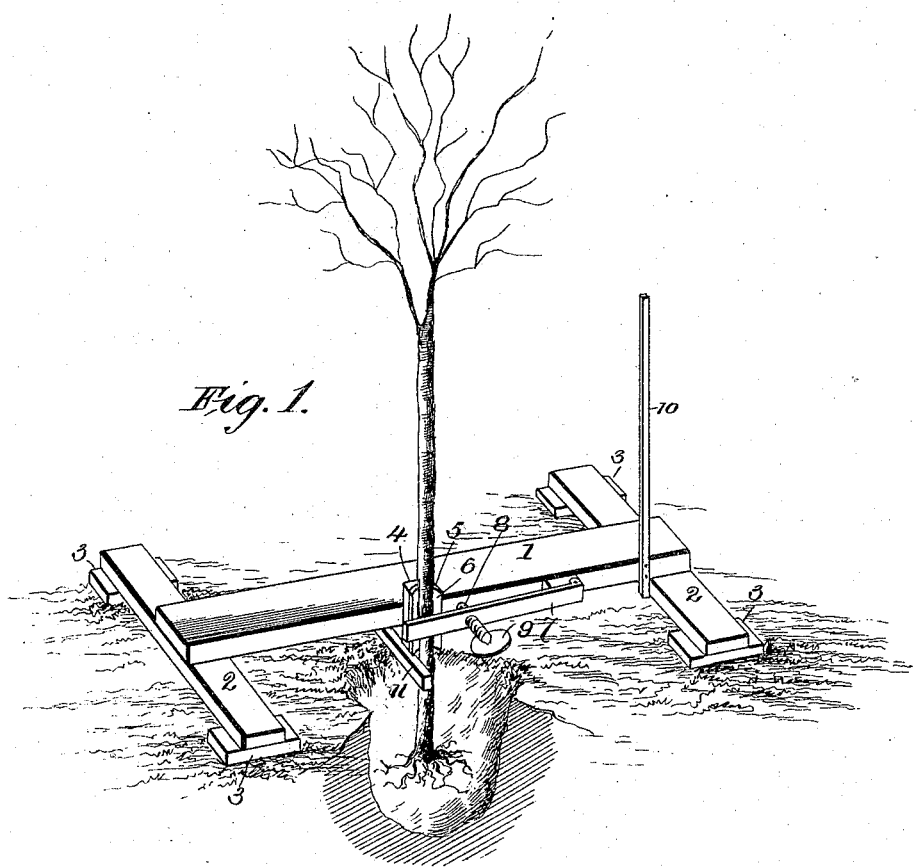

(No Model.)

C. B. BROWN.
TREE HOLDER.

No. 535,887. Patented Mar. 19, 1895.

Witnesses
J. W. Reynolds
Chas. S. Hyer

Inventor
Charles B. Brown
By John Wedderburn
Attorney

UNITED STATES PATENT OFFICE.

CHARLES B. BROWN, OF HAMPTON FALLS, NEW HAMPSHIRE.

TREE-HOLDER.

SPECIFICATION forming part of Letters Patent No. 535,887, dated March 19, 1895.

Application filed April 18, 1894. Serial No. 507,986. (No model.)

*To all whom it may concern:*

Be it known that I, CHARLES B. BROWN, a citizen of the United States, and a resident of Hampton Falls, in the county of Rockingham and State of New Hampshire, have invented certain new and useful Improvements in Tree-Holders; and I do hereby declare the following to be a full, clear, and exact description of the invention, such as will enable others skilled in the art to which it appertains to make and use the same.

This invention relates to tree holders, and has for its object to provide simple and effective means for supporting trees while filling the dirt in and around the roots of the same, and whereby one person can successfully place a tree in proper position and insure a perfect alignment with a row.

With these and other objects in view, the invention consists in the construction and arrangement of the several parts, which will be more fully hereinafter described and claimed.

In the drawings, Figure 1 is a perspective view showing the improved holder applied to a tree, the latter being in position in the hole. Fig. 2 is a top plan view of the improved device.

Similar numerals of reference are employed to indicate corresponding parts in both views.

Referring to the drawings, the numeral 1 designates a supporting bar having cross rests 2 at opposite ends thereof, which are supplied with feet or rest blocks 3 at their ends, the said cross rests being arranged transversely of the bar 1. Intermediate of the ends of the bar 1 is a socket 4 with a concaved engaging face 5 supplied with a suitable cushion of elastic or other material, as at 6. On the same side of the bar a hinged lever 7 is secured, and engaging the said lever and the adjacent portion of the bar is a clamping screw 8 having a winged or other suitable head 9.

At the angle of intersection of the bar 1 and one of the cross-rests 2 is an upright side-piece 10 by means of which it can be readily ascertained if the tree sets perpendicular. On the bottom of the bar 1, adjacent to the socket 4 is a horizontally disposed arm 11 which is long enough to ascertain if the bar 1 and the device are held on a level with the surrounding ground or surface, so as to set the tree as deep in the ground as before removal.

In operation, the bar 1 is placed across the hole in which the tree is to be planted with the cross rests bearing on opposite sides of said hole. The tree to be planted is then placed in the socket 4, and the end of the lever is brought against the tree and secured by the screw 8. The tree may then be lined up or properly positioned, as it is held in a vertical position and can be readily sighted, and after the dirt has been filled in around the roots the screw 8 is loosened and the lever released, so that the device entire may be quickly detached from the tree which has been set.

If desired and found preferable, the tree may be applied to the socket before the bar 1 is placed over the hole with equal efficiency and advantage.

Having thus described the invention, what is claimed as new is—

1. In a tree holder, the combination of a supporting bar, a socket applied thereto, and a lever adapted to co-operate with the socket, having a screw in connection therewith, the tree being placed in the socket and held by the lever, substantially as and for the purposes specified.

2. In a tree holder, the combination of a supporting bar, a socket applied thereto, a lever adapted to co-operate with the socket and having a screw in connection therewith, an upright sight-bar and lower horizontal arm, substantially as and for the purposes specified.

In testimony whereof I have signed this specification in the presence of two subscribing witnesses.

CHARLES B. BROWN.

Witnesses:
CHARLES N. DODGE,
FRANK H. LORD.